2,980,537

Patented Apr. 18, 1961

2,980,537

METHOD FOR TENDERIZING MEATS

William F. Hagen, Northbrook, Ill., assignor to The Union Stock Yard and Transit Company of Chicago, Chicago, Ill., a corporation of Illinois No Drawing. Filed Mar. 16, 1956, Ser. No. 571,891

6 Claims. (Cl. 99—107)

This invention relates to a method for processing meats to improve the tenderness of the meat and to accelerate the tenderization of meats, and it relates more particularly to the production of tenderized beef, veal, pork, lamb, and other meats and cuts of meats in the form of fresh meat, frozen meat, processed meats and the like, and it is an object of this invention to produce and to provide a method for producing tenderized meat products in a simple, rapid, and efficient manner.

While utilization can be made of freshly killed meats soon after rigor mortis has been completed, certain meats, as represented by beef, are greatly improved in texture, taste and tenderness if aged for a certain period of time after rigor mortis has been completed to enable the enzymes present in the meat to act and to bring about a noticeable tenderizing effect.

In the normal aging process, the beef is separated into various cuts and hung or otherwise stored in a refrigerated space for a time sufficent to permit the natural enzymes to carry out their tenderizing processes. It is believed necessary carefully to control the temperature conditions during the aging process to avoid excessive decomposition and bacterial growth. For this purpose, the refrigerated space in which the aging is carried out is usually maintained at a temperature of about 34° F. At this temperature, the activity of the enzymes is retarded to the extent that a minimum of about 21 days is required to achieve a desired tenderizing effect. While these conditions are not difficult to meet, the large amount of space that is tied up for the aging of the meat over such extended periods of time and the risk in deterioration of the meat during aging over this extended period of time are limiting factors in the acceptability of such natural aging processes.

If the temperature for aging is increased for purposes of accelerating the activity of the enzymes, the bacteria become active also under the conditions existing to increase the possibilities of spoilage of the meat and putrefaction with the consequent loss of meat. Mold growth is also accelerated to such an extent that appreciable losses are incurred by reason of the trimming necessary to remove the decomposed or molded parts. If the humidity in the refrigerated space is kept low enough to retard mold growth, the surface portions of the beef become desiccated and discolored with consequent loss by shrinkage and with loss from the trim required to cut off the desiccated and discolored parts.

When, under ideal conditions, the refrigerated space is maintained at a temperature of about 34° F. to hold down bacterial growth and when the refrigerated space is maintained at a relative humidity of about 80% to hold down mold growth, the rate of aging is also held down so that a minimum of 21 days is required to achieve the desired tenderizing effect. The low relative humidity causes shrinkage in amounts ranging from 3 to 5% by weight and the need for trimming off the discolored and desiccated parts adds further losses of from about 8 to 12% by weight. Thus, in addition to the tie up of considerable volumes of refrigerated space and in addition to the tie up of vast amounts of meat, the conventional aging processes are objectionable also from the standpoint of loss which is experienced due to trim and shrinkage.

Various means have been investigated by the butchering and by the meat-packing trade to accelerate the tenderizing process of meat and to cut down on the waste and to avoid the necessity for tying up large volumes of refrigerated space, and various means have been investigated to accelerate the tenderizing process without loss in taste, texture, quality, or appearance as compared to naturally aged meat. Commercial use has been made of an accelerated tenderizing process wherein the meat is stored, after rigor mortis has set in, at an elevated temperature within the range of 60–68° F. and at about 80% relative humidity to increase the activity of the enzymes and in which use is made of ultraviolet light to regard bacteria and mold growth. While the tenderizing process is greatly accelerated at the higher temperatures employed, certain defects exist in this commercial process.

At the higher temperatures employed, the meat can be tenderized in about 60 hours as compared to the 21 days required at 34° F. However, before the tenderizing process can be started, it is necessary to chill the meat down to a safe temperature below 40° F. while rigor mortis is completed and thus it is necessary to reheat the meat for storage at a temperature within the range of 60–68° F. for the accelerated tenderizing process. This chilling and reheating of the meat not only involves a wastage of meat, but once the meat has been chilled to a safe temperature, reheating more or less permanently softens the meat to the extent that it becomes difficult to firm and to form the meat for domestic use. More important is the fact that at a temperature in excess of 60° F., certain harmful bacteria are able to grow and it is therefore undesirable to make use of a tenderizing process in which meat is held for any length of time at an excess of 60° F.

When use is made of ultra-violet light to inhibit bacterial growth and mold growth, the oxygen in the air appears to be broken down into ozone which imparts a rancidity to the meat to the extent that a rancid odor can be detected in the vicinity of the aged meat and the meat appears to acquire a strange taste. If the lights are directed onto the meat, they tend to sunburn or discolor the meat in a manner which is characteristic of the change of the hemoglobin from oxyhemoglobin to metahemoglobin. Even when the lights are not directed onto the meat, the characteristic white fat on meat is given a yellow discoloration.

Thus, it is an object of this invention to provide a method for producing a tenderized meat product in considerably less time than that heretofore required by the natural or accelerated aging processes; which can be carried out while the meat is in a freshly killed, processed, or frozen state and while under chilled or refrigerated conditions thereby to avoid necessity for reheating the meat or maintaining carefully controlled conditions during processing; which can be employed for the tenderizing of processed as well as fresh meat and which can be employed to provide tenderization while the meat is being processed, such as in a pickling vat and the like; which can be carried out with relatively inexpensive equipment and inexperienced help thereby to make the process available to the small as well as the large meat packer or butcher; which can be carried out in large volumes and in relatively short periods of time thereby to permit a large turnover of meat per volume of space and per unit of equipment, and which permits the meat to be tenderized under conditions which minimize the possibilities of growth of undesirable bacteria and mold thereby to effect tenderization without noticeable change in taste or texture of the meat and without deterioration of the color, appearance, and moldability thereof.

One of the important concepts of this invention resides in the use of vibrational sound waves to effect breakdown of the connective tissues and binders in the meat whereby an immediate tenderization is secured substantially independently of the age of the meat, or the variety of the meat or the conditions existing during processing. Vibrational sound waves above the audible range of 15,000 cycles can be used.

Within this range, use can be made of vibrational sound waves of ultrasonic frequencies of from 200–900 kilocycles, but from the standpoint of economy in manufacture and use, and from the standpoint of depth of penetration of the energy into the meat, it is preferred to make use of vibrational waves in the lower portion of the supersonic range such as within the range of 20–200 kilocycles.

It has been found that when sound waves are used to excite the meat, the waves will be transmitted to some extent through the entire mass of the meat but that the higher concentrations of waves or energy will be absorbed by the connective tissues to cause breakdown thereof when the waves penetrating into the meat are of sufficient amplitude. Experiment has shown these tissues to have a higher absorption and a higher sound velocity than the softer or fatty tissues. The passage of vibrational waves through the meat causes rapid alternating of pressures or cavitations having their peaks spaced apart at a distance which is inversely proportional to the frequency of the waves. Thus the use of high frequencies provides for the presence of relatively short wave lengths having their peaks of pressure formed small distances apart. Thus, when the meat is subjected to supersonic sound waves of sufficient power to penetrate the meat and with sufficient amplitude to cause breakdown of the connective tissues and binders over which the waves travel, tenderization can be effected in very short order under refrigerated as well as warm conditions, on fresh as well as aged meats, on frozen as well as unfrozen meats, on raw as well as processed meats, and in controlled as well as uncontrolled atmospheric conditions.

To produce uniform tenderness in the meat, it is desirable to subject all of the connective tissues in the meat to a substantially uniform amount of vibrations of sufficient energy to break down the tissues. To achieve this end in the face of the variations existing in meats, the frequency of the vibrations and the positions of the meat relative to the source of the vibrations are adapted to be varied so that all portions of the meat will encounter substantially uniform vibrations. The penetration of the sonic energy into the meat, and the intensity distribution within the meat will be a function of the frequency of the vibrations. In general, the higher the frequency, the shorter the penetration. Or the higher frequencies will tend to produce energy distributions short distances within the boundaries of the meat. Lower frequencies will penetrate deeper into the meat before losing energy. Thus the energy distribution throughout the meat can be controlled by varying the frequency of the vibrations.

One of the difficulties in the use of vibrational waves at ultrahigh frequencies in the treatment of meats resides in the tendency of the meat, as a solid, to reflect a large proportion of the compressional waves or energy from the surfaces of the meat back into the medium in which the waves were generated. The reflection of sonic energy from interface of two media is a well-known phenomenon. The ratio of the incident energy to the energy transmitted into the second medium is a function of the ratio of the specific acoustic impedances of the two media. (Specific acoustic impedance is $pc$ where $p$ is density of medium and $c$ is velocity of sound in the medium.) The closer the ratio of the specific acoustic impedances is to unity the higher the ratio of the transmitted energy will be to the incident energy. Since the surfaces of meats and meat cuts vary and are in general quite irregular, it is not possible to have the surface of the meat in direct continuous contact with the surface of the metal plate.

To avoid the loss of energy by reflection when the vibrational waves are generated in a medium out of direct contact with the meat, it is desirable to make use of a coupling agent or medium for directly associating the meat with the transducer or transducers used to generate the vibrational waves.

In one concept, the cut of meat to be tenderized is coated on one or more of the cut faces with a layer of gelatin, animal grease, or other material capable of making good contact with the meat and with a specific acoustic impedance close to that of the meat, and which can either be removed from the meat by a simple and efficient means, such as a water wash or the like, and which is not harmful to the meat. The coated surface of the meat is then brought into intimate contact with a metal plate as by placing the meat with the coated side onto the surface of the horizontally disposed plate and by pressing the meat down onto the surface of the plate as by means of a weight or the like, or the meat is pressed between two or more metal plates.

The opposite side of the plate is connected, as by means of a cement or the like, to the face of the transducer or to the faces of a number of transducers adapted to operate at different frequencies, and preferably at resonant frequency. Energy is thus transmitted from the transducer or transducers substantially uniformly through the plate to the meat with an intensity that is inversely proportional to the area of the metal plate and the total area of the transducer face or faces. When a metal plate is used as the transmitter, best results are secured when the plate is formed to a thickness which is equal to an integral multiple of about one-half of the wave length of the vibration. When different frequencies are employed it is desirable, for most efficient use, to employ separate plates of the described optimum thickness. The temperature of the environment of the meat can be controlled so that the temperature rise of the meat caused by the absorption of sonic energy can be kept within prescribed limits.

The process described in the foregoing example can be modified to eliminate the coupling agent when intimate contact can be made over a substantial surface of the meat by application directly to the metal plate and preferably with a force sufficiently great to maintain such intimate contact during the tenderizing process.

Application of vibrational waves of supersonic frequency causes the compressional and cavitation forces to occur at closely spaced-apart points along the connective tissues and binder to effect breakdown thereof substantially uniformly throughout the meat. Breakdown sufficient to give a desirable tenderizing effect, at least as great as that secured by 21 days of natural aging, can be achieved within a matter of a few minutes or less by the process described herein. In most instances, the meat is excited by the vibrational waves for from 1 to 30 minutes and it is preferred, during this period, to subject the meat to waves of different frequencies within the described high frequency range, as by change in transducers energized or by progressive movement of the meat from one plate to another connected to separate transducers operating at different resonant frequencies. Where a series of transducers or plates are employed, it is desirable to make use of one set operating at a frequency in the lower supersonic range, such as at 20 kilocycles, to extend the energy deeply into the meat, following this with other sets operating at progressively higher frequencies to work on the tissues in the outer portions of the meat, thereby to achieve uniform coverage in less time and with less effort. After the meat has been treated to break down the connective tissues, the cut of meat is removed and the coating, if any, is stripped from the meat to prepare the meat for immediate use.

By way of a further example, the meat is first encased within a protective film or coating to enable immersion of the meat in a liquid through which the vibrational waves can be transmitted directly to the meat while the film protects the meat against the liquid. The film can be applied to the surface of the meat as a coating or a strippable film as by immersion in a liquid bath of a wax or a plastic material or by such conventional processes as flow-coating, spray-coating or the like. It has been found to be simpler and more efficient, however, to insert the cut of meat into a bag formed of a fluid-impervious material in which the walls are sufficiently thin and flexible to enable the bag to be drawn tightly against the surfaces of the meat, as by the use of vacuum or the like. In the preferred practice, use is made of bags formed of thin flexible walls of synthetic, resinous, or rubber-like film-forming materials.

After the protective coating has been formed about the meat, it is immersed in a liquid having the transducer or transducers directly in contact therewith for introducing the vibrational waves into the liquid for transmission through the liquid to the meat which is immersed therein. In this instance the liquid serves as the coupling between the meat and the transducers, and the liquid used has a specific acoustic impedance near to that of the meat. For purposes of economy, safety, and minimum effect on the meat, it is preferred to make use of water or other aqueous system as the coupling agent in which the meat is immersed for transmission of the vibrational waves from the transducers to the meat. It will be understood, however, that other liquids or fluids having the described characteristics of a coupler may be used.

The system is then set into vibration. The meat can be turned in the liquid through various positions relative to the transducer or transducers to expose various portions of the meat to the vibrational forces which are being generated. The vibrational waves are transmitted from the transducers through the liquid to the meat wherein forces are generated sufficient to cause breakdown of the connective tissues and binder. It is preferred to make use of transducers of different resonant frequencies immersed in the liquid for operation simultaneously or consecutively to expose the meat to different frequencies of vibrational waves. By this means it is possible to compensate for the differences in meats, as previously pointed out.

In the system described, the energy output of the transducers will be taken up in part by the liquid into which the transducers are immersed with the result that heat will be absorbed by the liquid. While some rise in temperature will not be objectionable, it is undesirable to make use of a liquid at a temperature sufficiently high to cause discoloration of the meat or to heat the meat up to a temperature which will interfere with the texture or refrigeration of the meat. As a result, the bath can be maintained at a desired temperature level by suitable refrigeration means such as by means of evaporator coils immersed directly in the liquid or by the circulation of refrigerant liquid through coils immersed in the liquid or by the use of a jacketed kettle through which cooling liquids or gases are circulated, or by other conventional refrigeration means.

By the process described, the connective tissues of the meat can be ruptured by the rapid alternations of pressures whether the meat is in a fresh, chilled, or frozen condition. Even the individual cells of the meat can be broken down by such operation, if desired. The degree of rupture and breakdown can be controlled by the intensity of the vibrations and by the length of exposure. The degree and intensity and length of exposure can be readily determined for each type of meat or each cut of meat. For example, vibrations at 20, 30, or 100 kilocycles over an exposure of about ⅓ to 1 minutes is sufficient for most cuts of beef.

The process of tenderizing can be carried out while the meat is immersed in solution for cure or pickling, to be followed with smoking if desired. For such purposes, use is usually made of brines of various compositions and at various strengths. In some instances, the curing solution is injected into the arteries and into the interior of the meat for accelerating cure. Generally, the meat is placed in large barrels filled with curing solution for complete immersion of the meat in the brine over a calculated period of time. The length of the cure varies between meats and cuts of meat and it is dependent upon the time required for the curing solution to penetrate uniformly through the meat and react chemically with the meat. It has been found that the process described herein can be employed not only to increase the tenderness of the meat but also to improve the uniformity of the curing process and the rate of the curing process, thereby to reduce the time required for cure.

By way of a further example illustrating this concept, the transducer or transducers or other source of vibrational sound waves is placed into the container or otherwise arranged for introducing the vibrational waves directly into the processing solution for transmission thereby to the meat immersed therein. Here the brine or processing solution serves as one coupling agent between the meat and the transducers. The specific acoustic impedance of the processing solution is adjusted if necessary to be nearly equal to that of the meat. When excited, as by ultrasonic vibrational sound waves, the meat is subjected to alternations of pressures or cavitations and the curing solution is caused to penetrate rapidly through the meat. In effect, the alternations of pressures or cavitations cause the solution to penetrate quickly into the meat. Concurrently, the connective tissues and muscle sheaths, which operate as a barrier to the penetration of the solution, are ruptured by the energy generated by the supersonic sound waves thereby to remove the barriers to the further penetration of the solution. The alternations of pressures on the surface of the meat hastens the penetration of the curing solutions into and through the meat with the barriers removed.

Thus the vibrational sound waves used to excite the meat in cure not only cause tenderization by reason of the breakdown of the connective tissues and binder but they operate to accelerate the cure and uniformity of cure of the meat thereby to provide a process wherein cure and tenderization can be carried out simultaneously to produce a cured and tenderized meat in less time than that heretofore required for either process alone.

It will be understood that changes may be made in the details of arrangement and operation and in the times and frequency of cure depending upon the various cuts of meat and the environment in which the process is carried out, without departing from the spirit of the invention especially as defined in the following claims.

I claim:

1. In the method of tenderizing meat in an unfrozen state, the steps of providing a source for generating vibrational sound waves at high frequencies, energizing the source to generate vibrational sound waves, coating one surface of the meat in an unfrozen state with a coupling agent for making solid contact with the source for generating the vibrational sound waves, and pressing the coated surface of the meat into a firm contacting relationship with the source for transmission of the generated vibrational sound waves from the source to the meat to excite the meat with vibrational sound waves at high frequencies in excess of 15,000 cycles for from ⅓ to 30 minutes whereby the alternating pressures generated in closely spaced-apart relation in the meat during passage along the connective tissues causes breakdown of the connective tissues.

2. In the method of tenderizing meat in an unfrozen state comprising the steps of providing a source for generating vibrational sound waves at high frequencies above 15,000 cycles, connecting the source for generating the vibrational sound waves with a body of a fluid having an acoustical impedance close to that of the meat, confining the meat in an unfrozen state within a protective covering of a material which is not affected by the fluid and which intimately engages the surface of the meat, immersing the meat in the body of fluid and energizing the source to generate vibrational sound waves at high frequencies which are transmitted through the fluid to the meat for a period of time ranging from ⅓–30 minutes to excite the meat with vibrational sound waves at high frequencies whereby the alternating pressures generated in the meat cause breakdown of connective tissues in the meat, removing the meat from the fluid when the desired amount of tenderizing has been effected, and removing the covering from the surface of the meat.

3. The method as claimed in claim 2 in which the covering on the meat comprises a bag formed of a continuous film of a highly flexible fluid-impervious material and which includes the step of drawing a vacuum in the interior of the bag to draw the bag in intimate contacting relation with the surface of the meat.

4. The method as claimed in claim 2 which includes the additional step of turning the meat in the fluid uniformly to expose the various surfaces to the vibrational energy.

5. The method as claimed in claim 2 in which the vibrational sound waves are generated at within the range of supersonic frequencies above the audible range but below 200 kilocycles.

6. In the method of tenderizing meat in an unfrozen state comprising the steps of providing a source for generating vibrational sound waves at high frequencies in excess of 15,000 cycles above the audible range, connecting the source for generating the vibrational sound waves with a body of fluid having an acoustical impedance close to that of the meat, confining the meat in an unfrozen state within a protective covering of a colloid which intimately engages the surface of the meat, immersing the meat in the body of fluid and energizing the source to generate vibrational sound waves at high frequencies which are transmitted through the fluid to the meat to excite the meat for a period of time ranging from ⅓–30 minutes with vibrational sound waves at high frequencies whereby the alternating pressures generated in the meat cause breakdown of connective tissues in the meat, removing the meat from the fluid when the desired amount of tenderizing has been effected, and removing the covering from the surface of the meat.

References Cited in the file of this patent

UNITED STATES PATENTS

| | | |
|---|---|---|
| 2,585,103 | Fitzgerald | Feb. 12, 1952 |
| 2,598,374 | Havens et al. | May 27, 1952 |
| 2,629,311 | Graves | Feb. 24, 1953 |
| 2,806,246 | Simjian | Sept. 17, 1957 |
| 2,830,912 | Simjian | Apr. 15, 1958 |

FOREIGN PATENTS

| | | |
|---|---|---|
| 1,592/31 | Australia | Apr. 13, 1931 |